Figure 1:
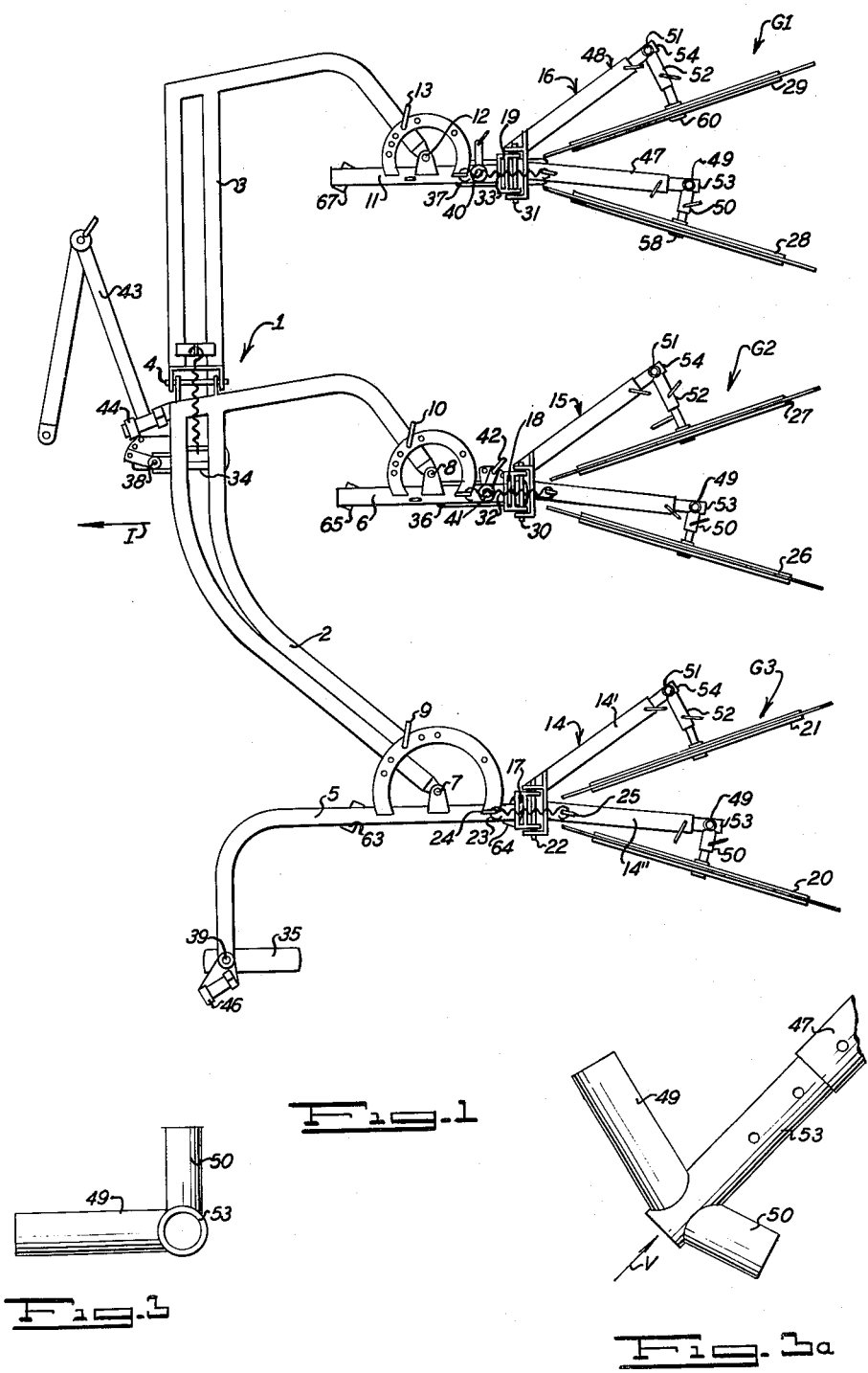

United States Patent Office 2,993,324
Patented July 25, 1961

1

2,993,324
SWATH SPLITTING AND TEDDING DEVICE
Cornelis van der Lely and Ary van der Lely, both of Maasland, Netherlands, assignors to C. van der Lely NV., Maasland, Netherlands, a Dutch limited company
Filed Sept. 30, 1957, Ser. No. 687,016
Claims priority, application Netherlands Dec. 19, 1956
10 Claims. (Cl. 56—370)

The invention relates to devices for working crop lying on the ground, and more particularly to devices of the type comprising a frame and a plurality of rake wheels mounted thereon to constitute a swath-splitter, i.e. a device which is capable of dividing a swath of hay or the like crop lying on the ground into at least two parts. In the operation of known swath-splitters, the rake wheels serve to split up a swath into two smaller swaths, the inner part of the swath being turned to the outside, so that the crop will be dried more rapidly.

According to the invention, there is provided a device for working hay or the like crop lying on the ground, wherein the device comprises a frame and a plurality of rake wheels associated therewith. The rake wheels are arranged oblique to the intended direction of travel of the device and in groups of two, the rake wheels of each group lying at an angle to one another, the arrangement being such that the device can occupy a first working position in which all the rake wheels lie side by side when viewed transverse to the intended direction of travel, and such that, by displacement of groups of rake wheels the device can be converted to a second working position in which the groups of rake wheels lie one behind the other in the intended direction of travel. In each of said working positions, the device constitutes a swath-splitter.

By arranging the groups of rake wheels one behind the other, when the device occupies its second working position, a large swath can be worked. If a swath is so large that no satisfactory effect can be obtained by means of two groups of rake wheels, a third group may be provided. The groups of rake wheels are preferably arranged on support members which are connected to the frame so as to be rotatable about the substantially vertical axes, thus permitting easy displacement of the rake wheels.

In order to insure that two swaths obtained by splitting one swath are a sufficient distance apart, when the device operates in its second working position, the rake wheels of the rear group are arranged at a larger angle than the rake wheels of a forward group. The pressure of the rake wheels on the ground may be reduced by providing each support member with an auxiliary support on which the rake wheels are arranged, at least part of the weight of the auxiliary support with its rake wheels being transferred to the support in a resilient manner by a spring.

In order to split up a swath into two swaths, the front sides of the rake wheels should be close to one another. This can be obtained by forming an auxiliary support with two limbs, on each of which a rake wheel can be mounted, at least one of the two rake wheels mounted on the auxiliary support being disposed between the limbs.

The device is preferably so constructed that a rake wheel may be arranged at different locations relative to a support member so that the positions of the rake wheels can be varied in accordance with the various operations to which the crop is to be subjected.

In order to increase the number of positions of the rake wheels in a simple manner, it is possible to provide a plurality of fastening members for a rake wheel on a limb, these members lying at an angle to one another and being of different lengths. An efficient variation of the angle between the rake wheels of one group can be obtained by connecting a rake wheel to a support by means of a pivot shaft the axis of which lies at an angle to the axis of the rake wheel, the pivot shaft being fixable in two different angular positions relative to the support member. The support members can be provided with additional mountings to which the rake wheels can be transferred, and when the rake wheels are so transferred, the device can be converted into a side delivery rake or swath turner by turning the support members about their vertical axes.

Figure 2:
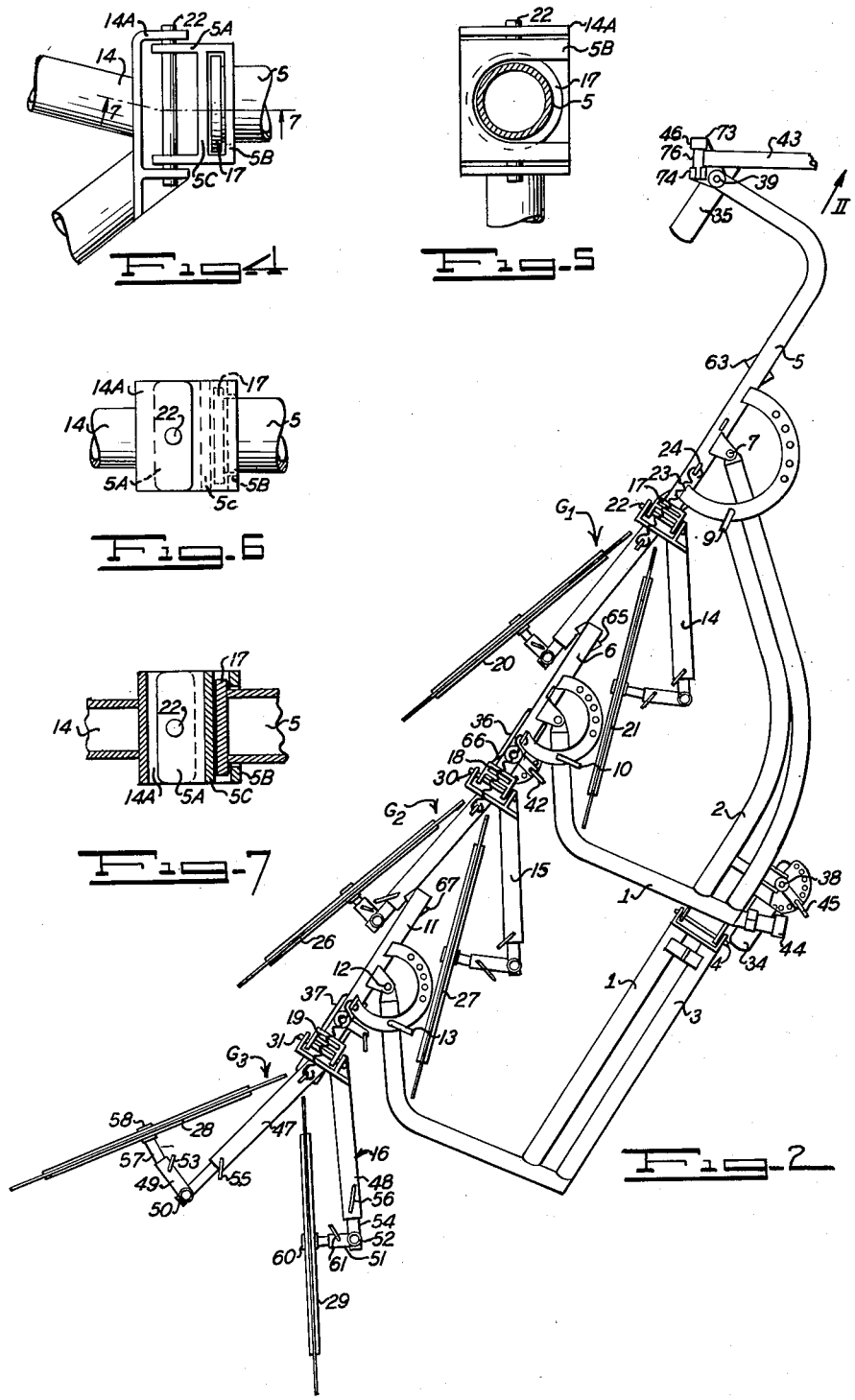
Figure 3:
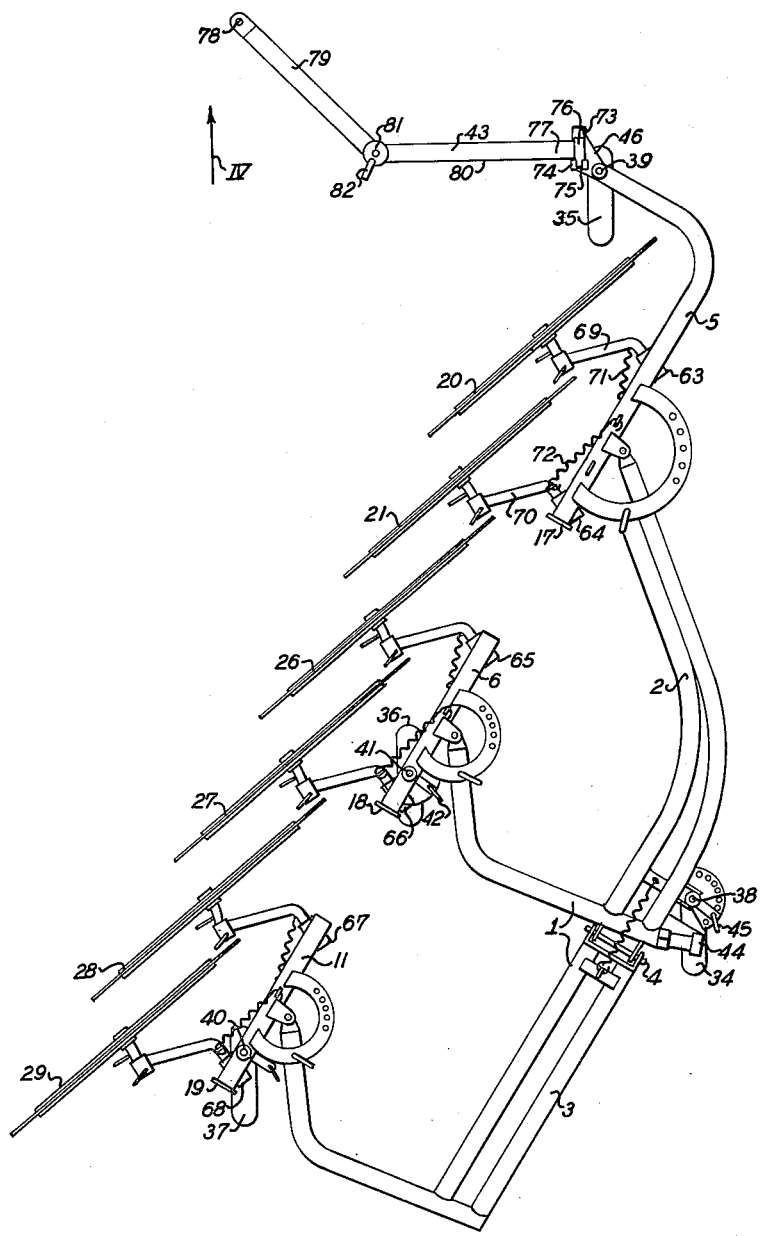
Figure 9:
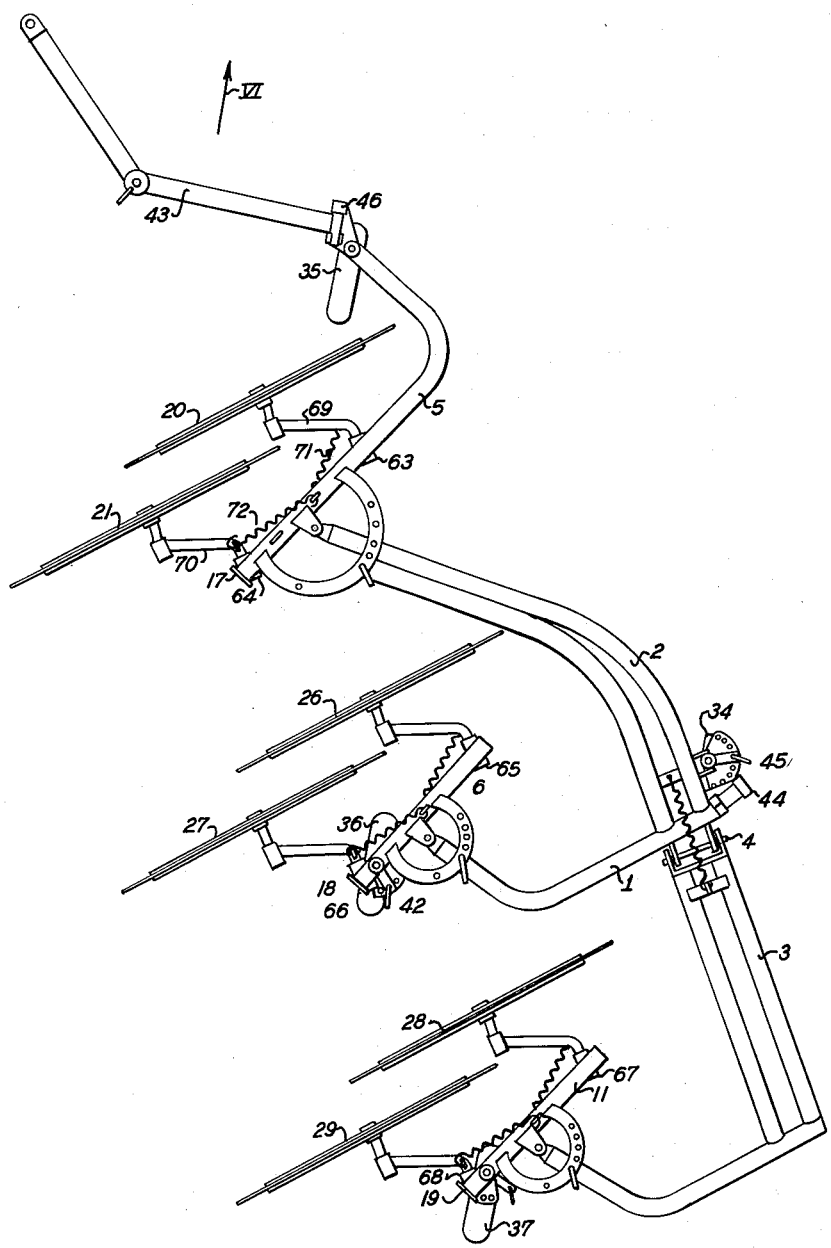

For a better understanding of the invention, and to show how the same may be carried into effect, reference will now be made to the accompanying drawings in which:

FIGURE 1 is a plan view of a device for working crop lying on the ground, the device being shown in a first working position, in which groups of rake wheels are arranged side by side to split up a plurality of swaths, FIGURE 2 is a plan view of the device shown in FIGURE 1, in a second working position, in which the groups of rake wheels, lie one behind the other to split up one large swath, FIGURE 3 is a top plan view of a support fastening member, FIGURE 3a is a perspective view of a modification thereof, FIGURE 4 is a top plan view of a support connecting means, FIGURE 5 is a view thereof taken from the right of FIG. 4, FIGURE 6 is a side elevational view of FIG. 4, FIGURE 7 is a sectional view taken on the line 7—7 of FIG. 4, FIGURE 8 is a plan view of the device shown in FIGURE 1, in a third working position in which it can act as a side delivery rake, and FIGURE 9 is a plan view of the device shown in FIGURE 1 in a fourth working position in which it can act as a swath turner.

Referring now to the drawings, there is shown a device for working crop lying on the ground. The device comprises a frame 1, having two sections 2 and 3 which are connected to one another by means of a horizontal pivot pin 4. The frame section 2 carries two supports or extensions 5 and 6, which are secured to the frame section 2 by means of vertical pivot pins 7 and 8, and which can be secured, by means of locking pins 9 and 10, in different positions relative to the frame section 2. The frame section 3 carries a support 11, which is secured to the frame section 3 by means of a vertical pivot pin 12, and can be secured by means of a locking pin 13 in different positions relative to the frame section 3. The supports 5, 6 and 11 carry two-armed auxiliary supports 14, 15 and 16 respectively, which can be connected in a simple and ready manner with the supports 5, 6 and 11 by slipping them over plates 17, 18 and 19, secured to these supports. In FIGURES 4–7 it can be seen that, for example, support 5 supports a member 5A which includes plates 5B and 5C which define a recess or opening. This opening receives plate 17. The auxiliary support 14 carries two rake wheels 20 and 21, one at the end of each arm 14′ and 14″ of the auxiliary support 14, and the rake wheels 20 and 21, are at an angle to one another together constituting one group G3 of rake wheels. The auxiliary support 14 with the rake wheels 20 and 21 is movable in a vertical direction relative to the support 5 about a horizontal shaft 22, which is secured to the end 14a of auxiliary support 14 near the connection of the auxiliary support 14 to the support 5. At least part of the weight of the auxiliary support 14 with the rake wheels 20 and 21 can be transferred to the support 5 by means of a draw spring 23, one end of which is secured to a lug 24, secured to the support 5, and the other end of which is secured to the free end of a lug 25, secured to the auxiliary support 14. The free end of the lug 25 lies at a higher level than the shaft 22, whereas the lug 24 lies approximately at the same level as the shaft 22. In the same manner in which the auxiliary support 14 carries rake wheels 20 and 21, the auxiliary support 15 carries rake wheels 26 and 27, which together constitute another group G2 of rake wheels, and the auxiliary support 16 carries rake wheels 28 and 29, which together constitute still another group G1 of rake wheels. The auxiliary supports 15 and 16 are pivotally connected to their supports 6 and 11 so as to be movable in a vertical direction about horizontal shafts 30 and 31, and at least part of the weight of the auxiliary supports 15 and 16 and their rake wheels is transferred to the supports 6 and 11 respectively by means of draw springs 32 and 33.

The device is supported by four ground wheels 34, 35, 36 and 37 of which the ground wheels 34, 35 and 37 are connected to the frame 1 by means of vertical shafts 38, 39 and 40, which are so disposed that the wheels 34, 35 and 37 can operate as caster wheels, at least in the working position shown in FIGURE 1. The ground wheel 36 is connected to the frame by means of a vertical shaft 41, the axis of which intersects the horizontal axis of the wheel 36 and the wheel 36 can be prevented from rotating about the vertical shaft 41 by means of a locking pin 42, so that the ground wheel 36 constitutes a direction-determining wheel, capable of taking up lateral forces exerted on the device. The device has a draw-bar 43 which is connected to the frame of the device by means of a fastening member 44.

Referring now in particular to FIGURE 1, the device is shown in a position in which it can act as a swath-splitter and in the operation of the device in that position the device is moved in the direction of the arrow I. The device is moved so that each group of rake wheels arranged on the auxiliary supports 14, 15 and 16 is directed to the center of a respective swath, so that, as the device moves in the direction of the arrow I, the rake wheels are rotated by coming into contact with the ground or the swath, and split the swaths apart.

Referring now to FIGURE 2, the device is shown, in a second working position in which it can also act as a swath-splitter, and which can be obtained from the position shown in FIGURE 1, by turning the supports 5, 6 and 11 about their vertical pivot pins 7, 8 and 12 respectively relative to the frame. In this position the device is drawn in the direction indicated by the arrow II, so that the groups G1, G2 and G3 of rake wheels 20—21, 26—27 and 28—29 lie one behind the other. The ground wheel 36 is positioned in the direction indicated by the arrow II, and in this second working position the ground wheel 34 is secured relative to the vertical shaft 38 by means of a locking pin 45.

In order to exert a tractive force on the device to move it in the direction indicated by the arrow II, the arm 43 is moved from its mounting on the fastening member 44 to a fastening member 46 which is secured to the vertical shaft 39 of the ground wheel 35. When the device is moved in the direction of the arrow II over a large swath the foremost group of rake wheels 20—21 will split up the upper part of the swath, and the second group of rake wheels 26—27 will split up the remainder of the swath. Since the rake wheels of these groups are disposed at only a small angle to one another, the split-up swaths will only lie at a small distance apart from one another, and since the crop will be dried more efficiently, if the swaths are spaced apart by a larger distance, the rake wheels 28 and 29 of the third group are set at a larger angle relative to one another than the rake wheels of the preceding groups. Thus the swaths formed by the first two groups of rake wheels from one large swath will be spaced apart a larger distance from one another by the third group of rake wheels, the distance being sufficient to permit satisfactory drying.

In order to obtain the position of the rake wheels 28 and 29 shown in FIGURE 2 these rake wheels are connected to the auxiliary support 16 in the following manner:

The auxiliary support 16 has two limbs 47 and 48, which are provided with fastening members 49 and 50 and fastening members 51 and 52 respectively and one rake wheel can be arranged on each such fastening member. The fastening members 49 and 50 are secured to a rod 53, which is slidable in the limb 47, so that these fastening members are displaceable longitudinally of the limb 47. In the same manner the fastening members 51 and 52 are secured to a rod 54 which is slidable in the limb 48. The rods 53 and 54 can be secured in different positions relative to the limbs 47 and 48 by means of locking pins 55 and 56. In the position shown in FIGURE 1, the rake wheels 28 and 29 are arranged on the fastening members 50 and 52, whereas in the position shown in FIGURE 2 the rake wheels 28 and 29 are arranged on the fastening members 49 and 51. In the position shown in FIGURE 2, the rods 53 and 54 relative to the position shown in FIGURE 1, have been turned through an angle of 90° about their longitudinal axes and have been slid outwardly from the limbs 47 and 48. The fastening member 49 is longer than the fastening member 50 (FIGURE 3) so that, when the rake wheel 28 is secured to the fastening member 49, the center of this rake wheel is more remote from the center line of the limb 47 than when it is secured to the fastening member 50. Similarly, the fastening member 52 is longer than the fastening member 51, so that the center of the rake wheel 29 is more remote from the center line of the limb 48, when the wheel is secured to the fastening member 52, than when it is secured to the fastening member 51. As is shown in FIGURES 1, 2 and 3 the fastening members 49 and 50 are at right angles to one another. The fastening members may be arranged, as is shown in FIGURE 3a, at an angle to one another in a plane which contains the center line of the limb.

The hub 58 of the rake wheel 28 is connected to the fastening members 49 or 50 by means of a pivot shaft 57, the axis of which lies at an angle to the axis of the rake wheel. In order to move the rake wheel 28 into the position shown in FIGURE 2, the pivot shaft 57 is turned through 180° relative to the position shown in FIGURE 1 about its own axis, so that the rake wheel 28 comes to lie at an angle to the direction of travel different from the angle to the direction of travel the rake wheel makes in the position shown in FIGURE 1. In the same manner the hub 60 of the rake wheel 29 is provided with a pivot shaft 61.

The rake wheels 20 and 21 and the rake wheels 26 and 27 are connected to their auxiliary supports 14 and 15 in the same manner as the rake wheels 28 and 29 are connected to the auxiliary support 16.

If the swath to be worked is not too large, the group of rake wheels 28 and 29 may be omitted, the group of rake wheels 26 and 27 being then moved into a position corresponding to the position of the rake wheels 28 and 29 of FIGURE 2 so that the swath is worked by only two groups of rake wheels. Since the splitting of swaths requires the front sides of the rake wheels to be near one another, one of the rake wheels of a group is arranged between the limbs of the auxiliary support, so that the distance between the front parts of the rake wheels is only as large as the thickness of one limb.

In order to permit the device to be changed from the working positions shown in FIGURES 1 and 2 into different working positions, the supports 5, 6 and 11 are provided with additional fastening members, to which the rake wheels can be transferred from the auxiliary supports. The support 5 has additional fastening members or mountings 63 and 64; the support 6 has additional fastening members or mountings 65 and 66, and the support 11 has additional fastening members or mountings 67. The rake wheels 20 and 21 can be arranged on the fastening members 63 and 64 and, in the same manner, the rake wheels 26 and 27 can be arranged on the fastening members 65 and 66 and the rake wheels 28 and 29 on the fastening members 67. In order to insure in these different working positions that the rake wheels yieldably contact the ground, the rake wheels are connected to the additional fastening members by means of cranks such as 69 and 70, support springs 71 and 72 being provided between the cranks and the supports for transferring at least part of the weight of each crank and its associated rake wheel to its respective support.

By providing this alternative manner of mounting the rake wheels on the supports 5, 6 and 11 the device can be converted into a side delivery rake, as is shown in FIGURE 8. In the position shown in FIGURE 8 the device is moved in the direction of the arrow IV, and, in order to maintain this direction, the ground wheels 36 and 34 are turned about their vertical shafts 38 and 41 and locked in the positions shown in FIGURE 8 by means of the locking pins 42 and 45. The ground wheels 35 and 37 operate, in this position, as caster wheels but the ground wheel 35 constitutes a steering wheel, because the draw-bar 43 is fastened to the vertical shaft 39.

By turning the supports 5, 6 and 11 about their pivot pins 7, 8 and 12 the device can be readily changed from the position shown in FIGURE 8 into the position shown in FIGURE 9, wherein the rake wheels arranged on a support work separate strips of ground, so that the device is thus adapted to act as a swath turner. The device is moved in the direction of the arrow VI by pulling on the draw-bar 43, and the positions of the ground wheels 36 and 34 are adapted to this new direction.

In order to permit the draw-bar 43 to be easily transferred from one fastening member 44 to the other fastening member 46, the fastenings members are similar and it will serve to describe only the fastening member 46 which comprises two aligned bearings 73 and 74, the bearing 74 being formed with a slit 75. The draw-bar 43 has a shaft 76, which fits in the bearings 73 and 74, and a portion 77 of the draw-bar can pass through the slit 75. By moving the draw-bar into a vertical position, so that the portion 77 is held in front of the opening 75 and by moving it parallel to the shaft 76, the draw-bar can be secured to or disengaged from a fastening member respectively. In order to enable a displacement of the traction point 78 of the draw-bar 43 relative to the shaft 76, the draw-bar has two arms 79 and 80, which are connected to one another by means of a pivotal connection 81. The portions 79 and 80 can be moved into different positions by turning them about the connection 81, as is evident from FIGURES 1 and 9 and they can be locked in different positions relative to the connection 81 by means of a locking pin 82.

What we claim is:
1. An agricultural implement comprising a frame, at least two groups of angularly disposed rake wheels, each group including two rake wheels disposed at an acute angle relative to each other, and means on said frame and operatively associated with said groups to support the groups selectively in parallel and in trailing relationship.

2. An implement as claimed in claim 1 wherein said frame includes sections each supporting at least one of the groups of rake wheels, comprising a horizontal pivot means connecting the sections.

3. An implement as claimed in claim 1 wherein said means includes vertical pivot pins supported on said frame, auxiliary supports pivoted on said pins and supporting said rake wheels, and locking means operatively associated with said auxiliary supports to fix the position of the same on said pins.

4. An implement as claimed in claim 3 wherein said means further comprises fastening members angularly disposed with respect to each other and supported by said auxiliary supports, said fastening members selectively supporting said rake wheels.

5. An implement as claimed in claim 4, comprising means on said frame detachably engaging said auxiliary supports.

6. An implement as claimed in claim 5, wherein said auxiliary supports each comprises angularly disposed arms supporting said fastening members.

7. An implement as claimed in claim 6, wherein in each group one of the rake wheels is supported between said arms.

8. An implement as claimed in claim 7, comprising a draw-bar and means on said sections for selectively connecting said draw-bar therewith.

9. An implement as claimed in claim 6, wherein said arms comprise two telescopically engaged parts which are adjustable with respect to each other.

10. An implement as claimed in claim 3, comprising axle means connecting said rake wheels to said auxiliary supports, said axle means defining two angularly disposed axes, one of said angularly disposed axes being the axis of rotation of the associated rake wheel, and the other of the angularly disposed axes being the axis of rotation of the axle means relative to the auxiliary support for permitting adjustment of the position of the rake wheels.

References Cited in the file of this patent

FOREIGN PATENTS

| | | |
|---|---|---|
| 1,081,746 | France | June 9, 1954 |
| 1,108,778 | France | Sept. 14, 1955 |
| 1,120,885 | France | Apr. 23, 1956 |